United States Patent Office 3,210,692
Patented Oct. 5, 1965

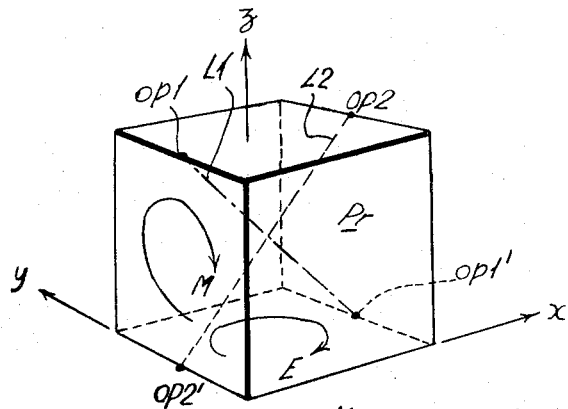
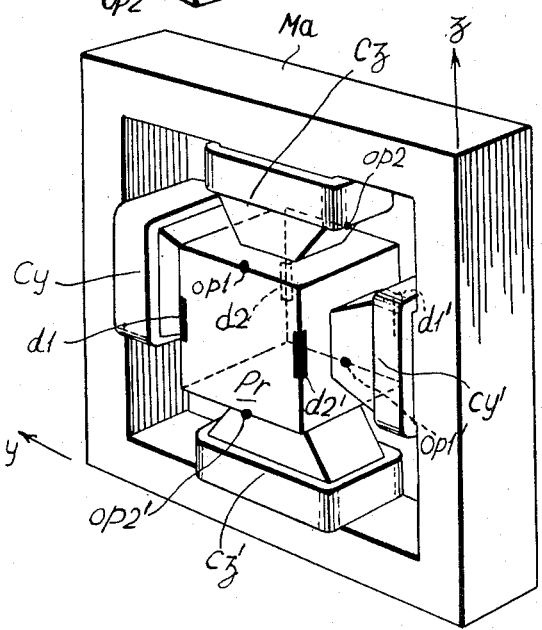
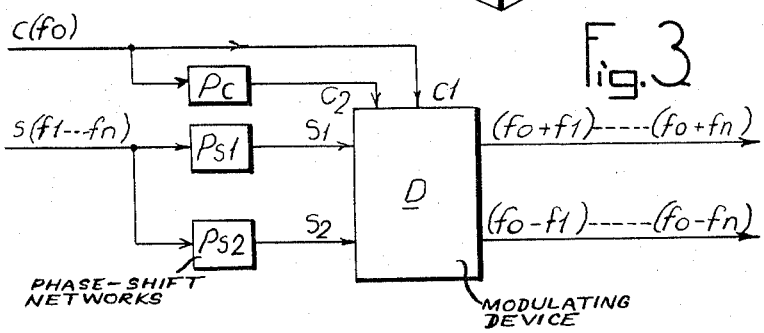

3,210,692
HALL PLATE MODULATOR USING ROTATING MAGNETIC CARRIER AND ROTATING ELECTRIC MODULATION TO PRODUCE SEPARATED UPPER AND LOWER SIDEBANDS
Wolja Saraga, Orpington, England, assignor to Associated Electrical Industries Limited, London, England, a British company
Filed Mar. 19, 1963, Ser. No. 266,408
Claims priority, application Great Britain, Mar. 22, 1962, 11,057/62
2 Claims. (Cl. 332—51)

This invention relates to modulation circuit arrangements for frequency translation of alternating current signals and is related to the invention disclosed in our copending application Serial No. 160,746.

The invention of our said copending application and also the present invention makes use of the Hall effect exhibited by a suitable conducting element, that is the effect by which, when a conducting element is carrying current and is subjected to a magnetic field transverse to the direction of the current, a voltage is produced between points on the element lying along a line transverse both to the current and to the field, the magnitude of the voltage being substantially proportional to the product of the components of the field and current at right angles to each other and to said line. An element which exhibits the Hall effect will be hereinafter referred to as a "Hall effect element."

According to one aspect of the invention described in our said copending application a Hall effect element is arranged to lie in a rotating magnetic field produced by suitable means responsive to a first alternating current signal applied to said means in different phases, and to have applied to it in different phases a second alternating current signal effective for producing in the element, in the same plane as the rotating magnetic field, a rotating electric current, the arrangement being such that, in use, there is obtained from the Hall effect element between points thereon lying along a line transverse to said plane an alternating output voltage signal which is substantially proportional to the vector product of the rotating magnetic field vector and the electric current vector, that is the product of the components of these vectors which are at right-angles to each other, which output voltage signal contains frequency components corresponding to upper or lower sideband frequencies of the modulation product of said first and second current signals. If the magnetic field and electric current vectors rotate in the same direction then the output voltage signal will contain frequency components corresponding to the lower sideband, whereas if they rotate in opposite directions it will contain frequency components corresponding to the upper sideband.

With such arrangement the output voltage signal is proportional to the amplitudes of the magnetic field and electric current vectors and to the sine of the angle between them. Thus if these two vectors rotate with angular velocities $\omega_0$ and $\omega_k$, respectively, the output voltage signal is proportional to $\sin(\omega_0+\omega_k)t$ or $\sin(\omega_0-\omega_k)t$, depending on whether the two vectors rotate in opposite directions or in the same direction.

As explained in our said copending application, this arrangement can be used for single sideband generation by using two differently phased versions $C1=C_0 \sin \omega_0 t$ and $C2=C_0 \cos \omega_0 t$ of a carrier oscillation to produce the magnetic field vector rotating with angular velocity $\omega_0$, and by using two differently phased versions $$S1=\sum_{k=1}^{k=n} a_k \cos(\omega_k t+\beta_k+\gamma_k)$$

and $$S2=\sum_{k=1}^{k=n} a_k \sin(\omega_k t+\beta_k+\gamma_k), \quad k=1$$

of a modulating signal S to produce a number of electric current vectors rotating with angular velocities $\omega_k$. Depending on the direction of rotation of the magnetic field vector with respect to the electric current vectors, the output voltage signal will represent either the upper or the lower sideband.

The modified arrangement now proposed offers substantially the same facilities as the arrangement disclosed in our said copending application—with some restrictions to be discussed later. What is more important it can be used for obtaining simultaneously the lower sideband at one pair of output points and the upper sideband at another pair of output points on a Hall effect element.

According to the present invention a Hall effect element is arranged to lie in a rotating magnetic field produced by suitable means responsive to a first alternating current signal and is arranged to have a second alternating current signal applied to it in such manner as to produce in the element a rotating electric current in a plane at an arbitrary angle ($\alpha$) to the plane of the rotating magnetic field, the Hall effect element having two pairs of output points of which one pair lie along a first line which is parallel to or coincident with the bisector of one of the angles of intersection of said planes while the other pair lie along a second line which is parallel to or coincident with the bisector of the supplementary angle of intersection of said planes, whereby with said signals applied there will be obtained from the Hall effect element, between the output points of said pairs, respective output voltage signals which contain in the one case lower sideband frequencies and in the other case upper sideband frequencies of the modulation product of the applied signals.

Thus in the arrangement of the present invention both sidebands can be obtained simultaneously but separately, so that if the ararngement is employed in a modulation arrangement in such manner that a carrier oscillation constitutes either the first or the second alternating current signal, while an alternating current signal to be frequency translated constitutes the other signal, the separate and simultaneous generation of both upper and lower sidebands will be achieved. Of course, if only one sideband signal is required, only the relevant pair of output points need be provided.

However, as compared with the modulation arrangement of our said copending application in which, under ideal conditions, only the required sideband (upper or lower) is produced, the arrangement of the present invention will unavoidably produce (except when the arbitrary angle $\alpha=0$) a component of the rotating electric current in its output signals. Where, as is contemplated would usually be the case, the rotating electric current is produced by the alternating current signal to be frequency translated, such a component may be classified as input signal lead. However, in practice the frequencies of the input signal would be far away from the sideband frequencies so that, in general, suppression of these unwanted components may be achieved by means of a relatively simple filter. On the other hand, if the rotating electric current is produced by the carrier oscillation, then the suppresison of the unwanted leakage components is more important because of the closeness of carrier and sideband frequencies. It is envisaged that in this instance such suppression would be carried out by injecting into the output a component of the carrier oscillation which is in phase opposition to, and thus tends to cancel out, any carrier leakage components.

As in the arrangement of our said copending application the means for producing the rotating magnetic field may be responsive to different phases of said first alternating current signal, for example to approximately in-quadrature phases of such signal or to three phases of the signal having phase differences of approximately 120°. It is also envisaged that the rotating magnetic field may be produced in other ways, with or without differently phased versions of the first alternating current signal, for example, by mechanical rotation, or by known wave-guide techniques if the signal is of relatively high frequency. The rotating electric field may be produced in the prism by applying different phases of said second alternating current signal to appropriately positioned input electrodes provided on the prism. Alternatively, other methods not using phasing may be employed, for instance, high frequency wave-guide techniques or mechanical rotation as in the case of the rotating magnetic field.

In order that the invention may be more fully understood reference will now be made by way of example to the accompanying drawing in which:

FIG. 1 is a diagram illustrating the theory on which the invention is based in the case where the magnetic and electric input vectors rotate in orthogonal planes;

FIG. 2 illustrates diagrammatically for this particular case a Hall effect device suitable for the invention; and FIG. 3 is a block diagram of a modulation arrangement embodying the invention.

Referring to FIG. 1, in a cube-shaped Hall effect prism $Pr$ there shown, let it be assumed that an electric input vector, the rotation of which is represented by the curved arrow E, is rotating in the plane $x$-$y$, and that a magnetic input vector, the rotation of which is represented by the curved arrow M is rotating in the plane $y$-$z$. The magnetic input vector M may be produced by two versions C1 and C2 of a carrier oscillation C, and the electric input vector E may be produced by two versions S1 and S2 of a modulating signal S in the manner set forth in our said copending application. Now consider two orthogonal lines L1, L2, of which the line L2 bisects the angle of intersection of the planes $x$-$y$ and $y$-$z$ (this angle being 90° in this instance), so that the line L1 can be considered as being parallel to the bisector of the supplementary angle of intersection of the planes $x$-$y$ and $y$-$z$ (this supplementary angle also being 90° in this instance). By virtue of the Hall effect there will be produced at output points $op1$ and $op1'$ lying along the line L1 a Hall output voltage vector containing lower sideband frequencies and at points $op2$ and $op2'$ lying along the line L2 a Hall output voltage containing upper sideband frequencies is obtained. With the present invention therefore both sidebands can be obtained simultaneously and separately, the one from points $op1$, $op1'$ and the other from points $op2$, $op2'$. A mathematical explanation of this result will be given later in the specification.

A possible device for producing the rotating magnetic and electric input vectors in orthogonal planes in a Hall effect prism is illustrated in FIG. 2. In this device a Hall effect prism $Pr$ is positioned at the centre of a four-pole magnetic structure $Ma$ and is subjected in the $y$-direction to a magnetic field produced by coils $Cy$, $Cy'$, and in the $z$-direction to a magnetic field produced by coils $Cz$, $Cz'$. Thus, if the field producing current in the coils $Cy$, $Cy'$ is the carrier oscillation C2, equal to $C_o \cos \omega_o t$, and the field producing current in the coils $Cz$, $Cz'$ is the carrier oscillation C1, equal to $C_o \sin \omega_o t$, then there is produced in the plane $y$-$z$ a rotating magnetic vector of magnitude $C_o$. Modulating current signals $$S1 = \sum_{k=n}^{k=n} a_k \cos(\omega_k t + \beta_k + \alpha_k)$$

and $$S2 = \sum_{k=n}^{k=n} a_k \sin(\omega_k t + \beta_k + \alpha_k)$$

are applied through the prism $Pr$ in the plane $x$-$y$ in directions perpendicular to each other, suitably between pairs of electrodes provided on the prism $Pr$ at its diagonals $d1$, $d1'$ and $d2$, $d2'$ respectively. Since the diagonals $d1$, $d1'$ and $d2$, $d2'$ are perpendicular to each other, and as all frequency components of the signals S1 and S2 have a phase difference of 90°, there is produced in the plane $x$-$y$ for each frequency component a rotating electric current vector of magnitude $a_k$. The expressions used above for the carrier oscillations C1 and C2 and for the signals S1 and S2 are the same as those used in our said copending application. In the manner previously explained two Hall effect output voltages are obtained from the prism $Pr$, one output voltage across diagonally opposed output points $op1$, $op1'$, and the other output voltage across diagonally opposed output points $op2$, $op2'$. The output voltage signal across points $op1$, $op1'$ is proportional to $\sin(\omega_0 - \omega_k)t$ disregarding constant angles and therefore corresponds to the lower sideband $(S2C2 - S1C1)$ produced by modulation of the carrier oscillation $Co$ by the modulating signal S, while the output voltage signal across points $op2$, $op2'$ is proportional to $\sin(\omega_0 + \omega_k)t$ disregarding constant phase angles and therefore corresponds to the upper sideband $(S2C2 + S1C1)$.

The modulation arrangement of FIG. 3 embodying the invention comprises three phase-shift networks PS1, PS2 and PC and a modulating device D which is a device such as illustrated in FIG. 2. The modulating signal S containing frequency components $f_1 \ldots f_n$ is simultaneously applied to the two phase-shift networks PS1 and PS2 which in response thereto respectively produce the in-quadrature versions S1 and S2 of the modulating signal S. The carrier oscillation $C_o = C1$ is applied to the phase-shift network PC which produces the in-quadrature version C2 of the carrier oscillation C1. The modulating signals S1, S2 and the carrier oscillations C1, C2 are applied to the modulating device D which functions in the manner already described to produce an upper sideband containing frequency components $(f_0 + f_1) \ldots (f_0 + f_n)$ at one output and a lower sideband containing frequency components $(f_0 - f_1) \ldots (f_0 - f_n)$ at another output. Other frequency components in the outputs due to signal leak and carrier leak can be suppressed by filtration, compensation or cancellation methods (not shown).

The phase-shift networks PS1, PS2 and PC may be of the types referred to in our said copending application in respect of similar networks employed therein.

Referring again to FIGS. 1 and 2 for the purpose of showing mathematically the theory on which the present invention is based in the case where the magnetic and electric input vectors M and E rotate in the orthogonal planes $y$-$z$ and $x$-$y$ respectively: in the plane $x$-$y$ let the resolved components of the electric input vector E in the $x$-direction and $y$-direction be $Ex$ and $Ey$ respectively, and in the plane $y$-$z$ let the resolved components of the magnetic input vector M in the $y$-direction and $z$-direction be $My$ and $Mz$ respectively. As a result of the Hall effect there is produced an output voltage $Vx$ in the $x$-direction, an output voltage $Vy$ in the $y$-direction and an output voltage $Vz$ in the $z$-direction. Disregarding their signs and a common proportionality constant these voltages may be considered as:

$$Vx=\pm EyMz, \; Vy=\pm ExMz \text{ and } Vz=\pm ExMy$$

As to the signs, depending on the type of coordinate system chosen and on the type of material used for the prism $Pr$, the sign of $Vx$ may be positive or negative. If the positive sign is chosen, the signs for $Vy$ and $Vz$ are also defined by the sequence of suffices provided the sequence V, E, M is retained. The sequence for $Vx$ is $xyz$, and $Vz$ has the same sign as $Vx$ because its suffix sequence can be obtained from that of $Vx$ by cyclic permutation. The sequence for $Vy$ can only be obtained by inversion and therefore the sign of $Vy$ is negative. Thus:

$$Vx=+EyMz, \; Vy=-ExMz \text{ and } Vz=+ExMy$$

Now let it be assumed that, for example, $Ey=s_0 \cos \omega_k t = S1 \qquad My=c_0 \cos \omega_0 t = C2$
$Ex=s_0 \sin \omega_k t = S2 \qquad Mz=c_0 \sin \omega_0 t = C1$ Then, disregarding a comon proportionality constant and the fact that in FIG. 2 S1 and S2 are applied at 45° to the $x$-axis:

$$Vx=S1C1, \; Vy=-S2C1 \text{ and } Vz=S2C2$$

These three equations show that in all three coordinate directions $x$, $y$ and $z$ double sideband signals are obtained. However, in the $x$-$z$ plane there can be obtained at points such as $op1$, $op1'$ and $op2$, $op2'$ lying along lines bisecting the angles between the two axes, that is, the axes in the $x$-direction and in the $z$-direction, the output voltage signals $$V_{z,x}=\frac{1}{\sqrt{2}}(V_z+V_x)\frac{1}{\sqrt{2}}(S2C2+S1C1)$$

$$V_{z,-x}=\frac{1}{\sqrt{2}}(V_z-V_x)\frac{1}{\sqrt{2}}(S2C2-S1C1)$$

These are the single sideband signals, as explained previously with reference to FIG. 2.

Since, as explained above, double sideband signals are obtained in all three co-ordinate directions $x$, $y$ and $z$, while pure single sideband signals are obtained in each of the two diagonal directions in the $x$-$z$ plane, it will be evident that in intermediate directions in the $x$-$z$ plane there may be obtained any desired combination of the two single sideband signals.

Thus with the Hall effect device shown in FIG. 2 for example, a desired combination could be obtained either from output points, such as points $op1$, $op1'$ and $op2$, $op2'$, which are arranged along lines in directions corresponding to the desired combination. Alternatively, there may be provided an external potentiometer arrangement having its fixed terminals connected across the output points $op1$, $op1'$ and $op2$, $op2'$ where the two single sidebands are obtained separately, the desired combination then being obtained by appropriate adjustment of the slide terminal of the potentiometer arrangement.

Although it is at present envisaged that the invention may usually be performed by arranging that the magnetic and electric input vectors are considered as rotating in orthogonal planes and thereby enabling a Hall effect device of relatively simple construction such as exemplified in FIG. 2 to be employed, the simultaneous production of upper and lower sidebands may also be obtained in conformity with the invention in cases where the rotating magnetic and electric input vectors are in respective generally transverse planes which are not orthogonal. This possibility, which will be shown mathematically next, is of importance since it demonstrates that deviations from orthognoality as far as the input vectors are concerned can be compensated for.

Let it be assumed that within a cube-shaped Hall effect prism such as shown in FIG. 1, the plane in which, say, the electric input vector E rotates is the $x$-$y$ plane and that the other, magnetic, input vector M rotates in a plane which is at an angle $$\alpha \neq 90° = \frac{\pi}{2}$$

with the $x$-$y$ plane. With the line of intersection of these two planes being chosen as an axis in the $y$-direction, the resolved components of the input vectors in the three co-ordinate directions, $x$, $y$ and $z$ (see FIG. 1) can be represented by the following expressions:

$Ex=S2 \qquad\qquad Mx=C1 \cos \alpha$
$Ey=S1 \qquad\qquad My=C2$
$Ez=0 \qquad\qquad Mz=C1 \sin \alpha$ There is produced as a result of the Hall effect an output voltage $Vx$ in the $x$-direction, an output voltage $Vy$ in the $y$-direction and an output voltage $Vz$ in the $z$-direction, these output voltages being as follows (disregarding the proportionality constants):

$$Vx=EyMz-EzMy=S1C1 \sin \alpha$$
$$Vy=EzMx-ExMz=S2C1 \sin \alpha$$
$$Vz=ExMy-EyMx=S2C2-S1C1 \cos \alpha$$

Now consider the output voltage $Vx$, $z$ in the $x$-$z$ plane in a direction at an angle $\beta$ from the $x$-direction:

$$Vx, z = Vx \cos \beta + Vz \sin \beta$$
$$\therefore Vx, z = S1C1 (\sin \alpha \cos \beta - \cos \alpha \sin \beta) + S2C2 \sin \beta$$

or $$Vx, z = S1C1 \sin (\alpha-\beta) + S2C2 \sin \beta$$

From this latter expression it will be seen that $Vx$, $z$ will be a single sideband if, Either $$\sin (\alpha-\beta) = \sin \beta$$

Or $$\sin (\alpha-\beta) = -\sin \beta$$

As the angle $\alpha$ is fixed by the chosen planes of the input vectors there are two equations for $\beta$: the solutions of these two equations will be designated by $\beta_1$ and $\beta_2$ respectively.

For $\beta_1$, $\alpha-\beta_1=\beta_1$, or $\beta_1=\frac{1}{2}\alpha$
For $\beta_2$, recalling that $\sin (\pi+\beta)=-\sin \beta$
$\alpha-\beta_2=\pi+\beta_2$, or $\beta_2=\frac{1}{2}\alpha-\frac{1}{2}\pi$.

These expressions show that the directions defined by $\beta_1$ and $\beta_2$ bisect the angles between the planes in which the input vectors rotate and that they are perpendicular to each other.

In the case $$\alpha=\frac{\pi}{2}, \; \beta_1=\frac{\pi}{4} \text{ and } \beta_2=-\frac{\pi}{4}$$

that is the special case shown in FIG. 1 illustrating the theory on which the invention is based.

It is to be appreciated that the relative magnitude of the two sidebands is proportional to $\sin \beta$, that is, the sideband in direction $\beta_1$ has a relative magnitude $$\sin \frac{\alpha}{2}$$

and the sideband in direction $\beta_2$ has a relative magnitude $$\cos \frac{\alpha}{2}$$

These two magnitudes are, ideally, equal for $$\alpha=\frac{\pi}{2}$$

that is, in the special case shown in FIG. 1.

It is also to be appreciated that it would appear that two separate sidebands are obtained in the special case where $\alpha=0$, that is, in the case described in our said copending application Serial No. 160,746 where the electric and magnetic input vectors rotate in the same plane. Although this seems to be a contradiction to the statement in our said copending application that for coplanar rotating electric and magnetic input vectors only a single sideband output is obtained, there is in fact no contradiction because for this special case $\beta_1=0$ and $\beta_2=-90°$. Consequently, although one single sideband is obtained in the direction $\beta=\pm 90°$, with amplitude sin $\beta_2=1$, the second single sideband which would be produced in the direction $\beta_1=0$ has a theoretical magnitude proportional to sin $\beta_1$, which is zero, and therefore this sideband is for practical purposes non-existent.

What I claim is:

1. A modulation circuit arrangement comprising a Hall effect element, a plural-phase electromagnetic structure, means for producing differently phased versions of a first alternating current signal, said structure being responsive to said differently phased versions to produce a rotating magnetic field to said Hall effect element, charactertized in that there is provided on said element a plurality of input electrode pairs lying along respective mutually crossing lines in a plane at an arbitrary angle to the plane of rotation of said magnetic field, the arrangement also including means for producing differently phased versions of a second alternating current signal which is to be modulated with said first alternating current signal, said input electrode pairs being connected for receiving respective ones of the differently phased versions of said second alternating current signal to produce in said element a rotating electric current vector in said plane which is at an arbitary angle to the plane of rotation of said magnetic field, and a pair of output electrodes on said Hall effect element which lie along a line parallel to the bisector of one of the angles of intersection of said planes, whereby with said first and second alternating current signals present there will be obtained from the Hall effect element at said output electrodes an alternating output voltage signal substantially proportional to the vector product of the rotating magnetic field vector and the rotating electric current vector and containing frequency components corresponding to upper or lower side-band frequencies of the modulation product of said, first and second alternating current signals.

2. A modulation circuit arrangement as claimed in claim 1, wherein there is provided on said Hall effect element a second pair of output electrodes which lie along another line parallel to the bisector of the supplementary angle of intersection of said planes, whereby with said first and second alternating current signals present there will be obtained from the Hall effect element at the two pairs of output electrodes respective alternating output voltage signals of which one contains frequency components corresponding to upper side-band frequencies and the other contains frequency components corresponding to lower side-band frequencies of the modulation product of said first and second alternating current signals.

References Cited by the Examiner

UNITED STATES PATENTS

| 2,649,574 | 8/53 | Mason. |
| 3,066,259 | 11/62 | Lennon. |
| 3,147,426 | 9/64 | Metzger _____ 324—45 X |

HERMAN KARL SAALBACH, *Primary Examiner.*

ALFRED L. BRODY, *Examiner.*